(12) United States Patent
Kirk et al.

(10) Patent No.: US 10,692,247 B2
(45) Date of Patent: *Jun. 23, 2020

(54) SYSTEM AND METHOD FOR COMPRESSING AND DECOMPRESSING SURFACE DATA OF A 3-DIMENSIONAL OBJECT USING AN IMAGE CODEC

(71) Applicant: Omnivor, Inc., Seattle, WA (US)

(72) Inventors: Adam G. Kirk, Mercer Island, WA (US); Oliver A. Whyte, Seattle, WA (US)

(73) Assignee: Omnivor, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,369

(22) Filed: Jun. 13, 2019

(65) Prior Publication Data
US 2019/0295293 A1 Sep. 26, 2019

Related U.S. Application Data

(63) Continuation-in-part of application No. 16/262,860, filed on Jan. 30, 2019, now Pat. No. 10,360,727, and a continuation-in-part of application No. PCT/US2018/044826, filed on Aug. 1, 2018, said application No. 16/262,860 is a continuation-in-part
(Continued)

(51) Int. Cl.
| | |
|---|---|
| *G06T 17/30* | (2006.01) |
| *G06T 9/00* | (2006.01) |
| *G06T 15/20* | (2011.01) |
| *G06T 15/50* | (2011.01) |
| *G06T 15/04* | (2011.01) |

(52) U.S. Cl.
CPC ............... *G06T 9/00* (2013.01); *G06T 15/04* (2013.01); *G06T 15/20* (2013.01); *G06T 15/506* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 5,870,220 A | * | 2/1999 | Migdal | ................ G01B 11/24 250/559.22 |
| 5,983,251 A | * | 11/1999 | Martens | ............... H04N 19/186 375/E7.083 |

(Continued)

*Primary Examiner* — Said Broome
(74) *Attorney, Agent, or Firm* — Law Office of Mark A. Thomas

(57) ABSTRACT

A processor implemented method for compressing surface data of a 3 dimensional object in a global digital space, using an image encoder that supports an image data compression algorithm, the image encoder being coupled to a transmitter. The method includes the steps of (i) decomposing the surface data into at least one surface representation that is encoded in an oriented bounding box, (ii) transforming the oriented bounding box into a canonical camera representation to obtain canonical coordinates for the at least one surface representation, (iii) converting each of the at least one surface representation into at least one bounding box image pair that includes a grayscale image representing depth, and a color image and (iv) tiling the at least one bounding box image pair to produce a tiled bounding box image.

29 Claims, 13 Drawing Sheets

Related U.S. Application Data of application No. 16/049,764, filed on Jul. 30, 2018, now Pat. No. 10,229,537.

(60) Provisional application No. 62/540,111, filed on Aug. 2, 2017.

(56) References Cited

U.S. PATENT DOCUMENTS

| | | | | |
|---|---|---|---|---|
| 6,782,132 B1* | 8/2004 | Fogg | ................ | G06T 1/20 348/716 |
| 2003/0215011 A1* | 11/2003 | Wang | ................ | H04N 19/176 370/240.03 |
| 2004/0032980 A1* | 2/2004 | Harman | ................ | G06T 9/001 382/154 |

* cited by examiner

SYSTEM AND METHOD FOR COMPRESSING AND DECOMPRESSING SURFACE DATA OF A 3-DIMENSIONAL OBJECT USING AN IMAGE CODEC

CROSS-REFERENCE TO RELATED APPLICATIONS

This patent application is a continuation-in-part and claims the benefit of U.S. non-provisional patent application Ser. No. 16/262,860, filed on Jan. 30, 2019, international patent application Ser. No. PCT/US18/44826, filed Aug. 1, 2018, U.S. non-provisional patent application Ser. No. 16/049,764, filed Jul. 30, 2018, now U.S. Pat. No. 10,229,537, and U.S. provisional patent application No. 62/540,111, filed on Aug. 2, 2017, the complete disclosures of which, in their entireties, are hereby incorporated by reference.

BACKGROUND

Technical Field

Embodiments of this disclosure generally relate to compressing surface data of one or more 3 dimensional objects, and more particularly, to compressing and decompressing the surface data of the one or more 3 dimensional objects in a global digital space using an image codec.

Description of the Related Art

Various compression techniques may be used for compressing two dimensional (2D) and three dimensional (3D) data, for applications such as for video games and animation, content download, and streaming. A typical mesh solution for compression, mesh parameterization, has parameters with multiple vertices and edges. Mesh parameterization, while allowing for an accurate surface representation, is difficult to compress, often requiring decimation techniques to remove vertices. In addition, a specific type of customized encoder may be typically required to encode 3 dimensional surface data, which may not be compatible with existing encoders that are used in most commercially available devices. Whereas compression of full 3 dimensional data is challenging, 2-dimensional data fails to provide an interactive and engaging experience.

Accordingly, there remains a need for a compressing and decompressing surface data of 3-dimensional objects that is compatible with common image compression algorithms, such those defined in image coding specifications and standards.

SUMMARY

In view of the foregoing, an embodiment herein provides a processor implemented method for compressing surface data of a 3 dimensional object in a global digital space, using an image encoder that supports an image data compression algorithm, the image encoder being coupled to a transmitter. The method includes the steps of (i) decomposing the surface data into at least one surface representation that is encoded in an oriented bounding box, (ii) transforming the oriented bounding box into a canonical camera representation to obtain canonical coordinates for the at least one surface representation, (iii) converting each of the at least one surface representation into at least one bounding box image pair that includes a grayscale image representing depth, and a color image and (iv) tiling the at least one bounding box image pair to produce a tiled bounding box image. The at least one surface representation is parameterized in 2 dimensions as a depth map with color data, and the oriented bounding box is parameterized to define a location and an orientation in the global digital space. The depth map is encoded by the image encoder as the grayscale image, and the color image represents texture. The image encoder compresses the tiled bounding box image to obtain a compressed tiled bounding box image.

In some embodiments, the transforming the oriented bounding box into the canonical camera representation includes scaling the oriented bounding box such that the depth map is represented at a bit depth that is supported by the image data compression algorithm of the image encoder.

In some embodiments, the at least one surface representation is in the shape of at least one of a rectangular grid, a pipe, a cylinder, and a truncated pyramid, at least one parameter that characterizes the at least one surface representation is stored separately from the tiled bounding box image as metadata or as an independent data stream, and the at least one parameter is used to transform the surface representation from the canonical coordinates back to the global digital space.

In some embodiments, the decomposing the surface data into the at least one surface representation includes dividing the surface data into at least one initial region, and constructing a best fit oriented bounding box.

In some embodiments, the best fit oriented bounding box is constructed such that each normal of each of the at least one surface representation within the best fit oriented bounding box is no more than 90 degrees apart from the bounding box axis most closely aligned with the median surface normal and there are no discontinuities in the depth map where one surface is not adjacently connected to another, for the at least one region.

In some embodiments, if the best fit oriented bounding box includes normals that are more than 90 degrees apart from the bounding box axis most closely aligned with the median surface normal, or a hidden-surface discontinuity where one surface is not adjacently connected to another, then the best fit oriented bounding box is split into two or more oriented bounding boxes with normals that are not more than 90 degrees apart from the bounding box axis most closely aligned with the median surface normal, or a different type of surface representation is selected based on a topology of the 3 dimensional object.

In some embodiments, the best fit oriented bounding box is constructed such that each normal of each of the at least one surface representation within the best fit oriented bounding box is no more than 60 degrees apart from the bounding box axis most closely aligned with the median surface normal.

In some embodiments, if a number of oriented bounding boxes exceeds a threshold, then the oriented bounding boxes are merged by selecting pairs of oriented bounding boxes that will produce the smallest volume increase over the sum of the volumes of the oriented bounding boxes before merging.

In some embodiments, the image data compression algorithm is based on an image coding standard selected from PNG, JPEG, TIFF, and BMP.

In some embodiments, the grayscale image and the color image are encoded at different resolutions.

In some embodiments, the oriented bounding box is transformed into the canonical camera representation by inverting position, rotation and warping transformations.

In some embodiments, the parameters transforming the oriented bounding box from the canonical coordinates to global digital space for the oriented bounding are stored separately from the tiled bounding box image as metadata or as an independent data stream.

In some embodiments, the depth is encoded as a grayscale image in a luma channel and a material of the 3 dimensional object, or at least one unit-length surface normal of the at least one surface representation, is encoded in a U chroma channel and a V chroma channel.

In some embodiments, a 2D vector that represents a principal axis of anisotropy in the material of the 3 dimensional object is defined using the U chroma channel and the V chroma channel. In some embodiments, when a magnitude of the 2D vector is above a threshold, the material is determined to be anisotropic, and when the magnitude of the 2D vector is below the threshold, the material is determined to be isotropic.

In some embodiments, the at least one initial region that includes the at least one surface representation is preselected, or recognized based on automatic object recognition, and a resolution for the at least one surface representation in the at least one initial region is modified.

In some embodiments, when a representation of the depth map requires more bits than a bit depth that is supported by the image coding standard of the image encoder, the representation of the depth map is encoded in a first depth tile and residual information is encoded in a second depth tile.

In some embodiments, invalid pixels are represented in only one image selected from the grayscale image and the color image, and valid pixels are extrapolated to overwrite the invalid pixels in the image in which invalid pixels are not represented.

In some embodiments, a surface representation having a lower resolution, is detected, and a pre-defined value is subtracted from the depth map to project the surface representation having a lower resolution behind a surface representation having a higher resolution, when any two of the at least one surface representation overlap.

In one aspect, a method for decompressing compressed surface data of a 3 dimensional object in a global digital space using an image decoder that supports an image data decompression algorithm is provided. The method includes (i) obtaining a compressed tiled bounding box image, (ii) decompressing the compressed tiled bounding box image to obtain a tiled bounding box image that includes at least one bounding box image pair, (iii) extracting transformation information for the at least one bounding box image pair to obtain at least one surface representation that is encoded in an oriented bounding box, (iv) applying a bounding box transformation to the at least one tiled bounding box image pair to obtain oriented bounding box parameters including a depth map and texture in global coordinates in the global digital space, (v) positioning the surface representation in a 3 dimensional space based on the oriented bounding box parameters, and the user view input and (vi) applying the texture from the at least one bounding box image pair to the surface representation in the 3 dimensional space to obtain at least one textured surface representation. The at least one bounding box image pair includes a grayscale image representing a depth map, and a color image representing texture. The at least one surface representation is parameterized in 2 dimensions as the depth map with color data.

In some embodiments, the surface representation is positioned in the 3 dimensional space by triangulating the depth map, or by converting each depth map into 3 dimensional points with normals and triangulating the 3 dimensional points in the global digital space.

In some embodiments, a visible surface for each display pixel is determined to render the 2 dimensional image from a perspective that is determined by a position of a virtual camera, which is obtained from the user view input.

In some embodiments, the method further includes extracting normals from chroma channels or computing surface normals from the depth map and rendering view dependent lighting on the textured surface representation based on material information and the surface normal. The tiled bounding box image may further include the material information.

In some embodiments, the method further includes the steps of (i) obtaining a range of values of the material information corresponding to an object type of a portion of the 3 dimensional object directly from a network, separate from the tiled bounding box image as metadata or as an independent data stream, (ii) detecting the object type based on the range of values of the material information corresponding to the portion of the 3 dimensional object and (iii) computing specular reflections based on a principal axis vector of the portion of the 3 dimensional object.

In another aspect, one or more non-transitory computer readable storage mediums storing one or more sequences of instructions, which when executed by one or more processors, causes a processor implemented method for compressing surface data of a 3 dimensional object in a global digital space, using an image encoder that supports an image data compression algorithm is provided. The method includes the steps of (i) decomposing surface data into at least one surface representation that is encoded in an oriented bounding box, (ii) transforming the oriented bounding box into a canonical camera representation to obtain canonical coordinates for the at least one surface representation, (iii) converting each of the at least one surface representation into at least one bounding box image pair that includes a grayscale image representing depth, and a color image and (iv) tiling the at least one bounding box image pair to produce a tiled bounding box image. The at least one surface representation is parameterized in 2 dimensions as a depth map with color data, and the oriented bounding box is parameterized to define a location and an orientation in the global digital space. The depth map is encoded by the image encoder as the grayscale image, and the color image represents texture. The image encoder compresses the tiled bounding box image to obtain a compressed tiled bounding box image.

In some embodiments, the transforming the oriented bounding box into the canonical camera representation includes scaling the oriented bounding box such that the depth map is represented at a bit depth that is supported by the image data compression algorithm of the image encoder.

In some embodiments, the decomposing the surface data into the at least one surface representation includes dividing the surface data into at least one initial region, and constructing a best fit oriented bounding box.

In some embodiments, if the best fit oriented bounding box includes normals that are more than 90 degrees apart from the bounding box axis most closely aligned with the median surface normal, or a hidden-surface discontinuity where one surface is not adjacently connected to another, then the best fit oriented bounding box is split into two or more oriented bounding boxes with normals that are not more than 90 degrees apart from the bounding box axis most closely aligned with the median surface normal, or a different type of surface representation is selected based on a topology of the 3 dimensional object.

In some embodiments, the different type of surface representation that is selected based on the topology of the 3 dimensional object is in the shape of a cylinder, and a minimum radius, a maximum radius, and an axis length of the cylinder are stored separately from the tiled bounding box image as metadata or as an independent data stream, the oriented bounding box is defined by a position, an orientation, the axis length and a radius of the cylinder, and depth pixels are represented by values of the radius along axial and azimuthal directions.

In yet another aspect, a system for compressing surface data of a 3 dimensional object in a global digital space, using an image encoder that supports an image data compression algorithm is provided. The system includes a processor and a non-transitory computer readable storage medium storing one or more sequences of instructions, which when executed by the processor, performs a method including: (i) decomposing the surface data into at least one surface representation that is encoded in an oriented bounding box, (ii) transforming the oriented bounding box into a canonical camera representation to obtain canonical coordinates for the at least one surface representation, (iii) converting each of the at least one surface representation into at least one bounding box image pair that includes a grayscale image representing depth, and a color image and (iv) tiling the at least one bounding box image pair to produce a tiled bounding box image. The at least one surface representation is parameterized in 2 dimensions as a depth map with color data, and the oriented bounding box is parameterized to define a location and an orientation in the global digital space. The depth map is encoded by the image encoder as the grayscale image, and the color image represents texture. The image encoder compresses the tiled bounding box image to obtain a compressed tiled bounding box image.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
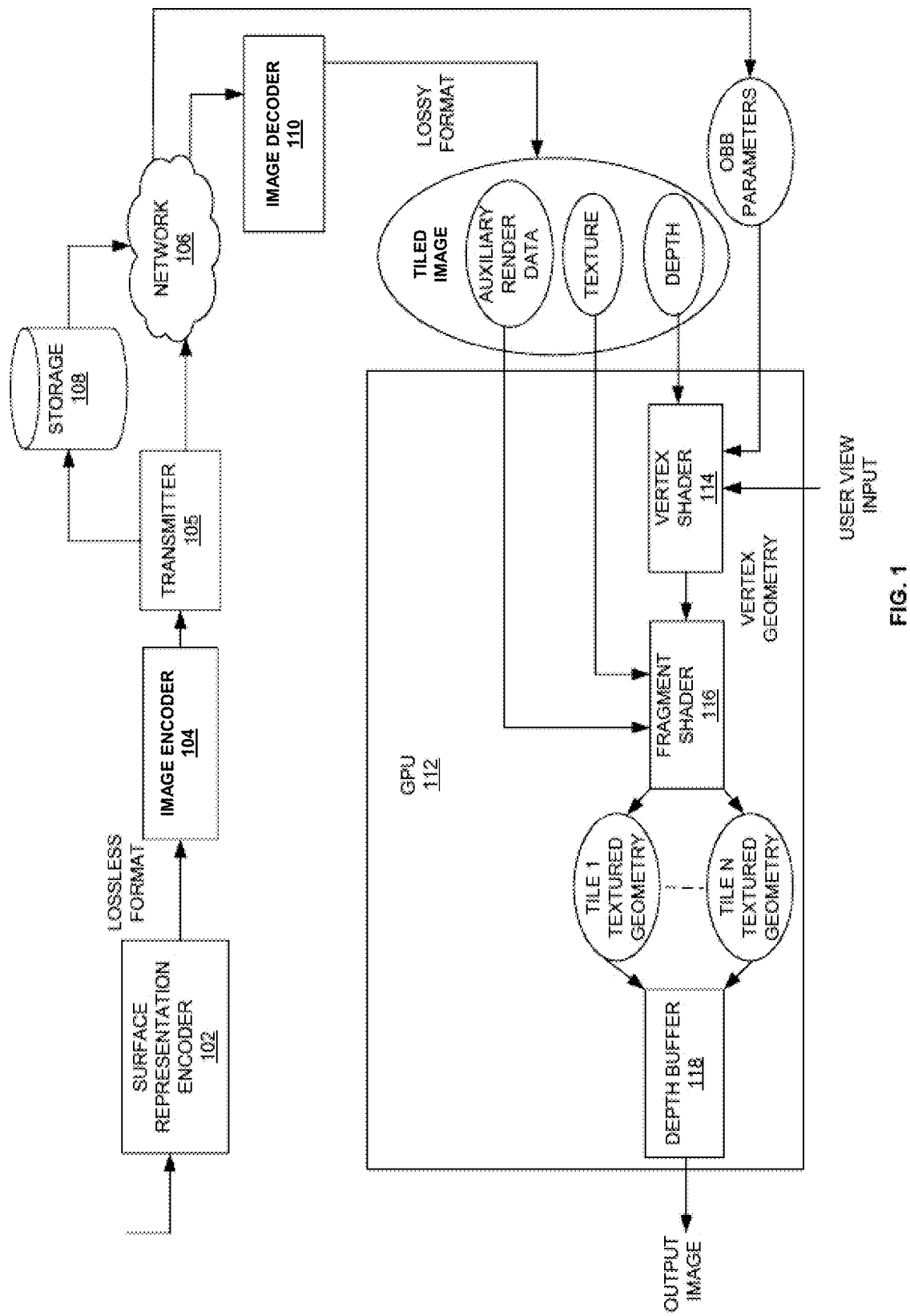
FIG. 1 is a block diagram of compressing and decompressing surface data of a 3 dimensional object in a global digital space according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for a system and method for compressing and decompressing surface data of a 3 dimensional object in a global digital space, using an image encoder that supports an image data compression algorithm. Referring now to the drawings, and more particularly to FIGS. 1 through 10, preferred embodiments are shown, where similar reference characters denote corresponding features consistently throughout the figures.

FIG. 1 is a block diagram of compressing and decompressing surface data of a 3 dimensional object in a global digital space according to some embodiments herein. The block diagram includes a surface representation encoder 102, an image encoder 104, a transmitter 105, a network 106, a storage 108, an image decoder 110 and a Graphics Processing Unit (GPU) 112. The surface representation encoder 102 obtains the surface data of the 3 dimensional object in the global digital space. In some embodiments, an input to the surface representation encoder 102 may be at least one of (i) one or more image streams that can be converted to 3 dimensional data, (ii) one or more depth camera or range sensor streams, or (iii) 3 dimensional synthetic data or mesh data. In some embodiments, the surface data may represent one or more objects, which may include any of a synthetic data object, a human being, animal, a natural scenery, etc. In some embodiments, the surface data may be taken from a 3 dimensional surface data, 3 dimensional animations, or images. The object may be a digital representation of a 3 dimensional object.

The surface representation encoder 102 decomposes the surface data into at least one surface representation that is encoded in an oriented bounding box. The at least one surface representation is parameterized in 2 dimensions as a depth map with color data, and the oriented bounding box is parameterized to define a location and an orientation in the global digital space. In some embodiments, the surface representation includes a 2 dimensional surface that is embedded in 3 dimensions. The surface representation may include a 2 dimensional surface that is parameterized in a rectangular grid. The surface representation encoder 102 transforms the oriented bounding box into a canonical camera representation to obtain canonical coordinates for the at least one surface representation.

The surface representation encoder 102 converts each of the at least one surface representation into at least one bounding box image pair that includes a grayscale image representing depth, and a color image. The depth map is encoded by the image encoder 104 as the grayscale image. The color image represents texture. The surface representation encoder 102 tiles the at least one bounding box image pair to produce a tiled bounding box image. In some embodiments, the tiled bounding box image is in a lossless format.

The image encoder 104 compresses the lossless tiled bounding box image to obtain a compressed tiled bounding box image in high quality using the image data compression algorithm. In some embodiments, the image data compression algorithm is based on an image coding standard selected from PNG, JPEG, TIFF, and BMP. In some embodiments, the image data compression algorithm may be an image coding specification. The image encoder 104 may be implemented using software or hardware, or any combination thereof. In some embodiments, the surface representation encoder 102 and the image encoder 104 are in the same device. In another embodiment, the surface representation encoder 102 and the image encoder 104 are in different devices.

The image encoder 104 communicates the compressed tiled bounding box image to at least one of (i) the network 106 or the storage 108 through the transmitter 105 based on selection of a user. In some embodiments, the storage 108 may be a server. The network 106 communicates the compressed tiled bounding box image to the image decoder 110. In some embodiments, the image decoder 110 may be part of a mobile phone, a headset, a tablet, a television, etc. In some embodiments, the network 106 may be a wired network or a wireless network.

The image decoder 110 decodes the compressed surface data of the 3 dimensional object in the global digital space by (i) obtaining the compressed tiled bounding box image, (ii) decompressing the compressed tiled bounding box image to obtain a tiled bounding box image that includes at least one bounding box image pair, (iii) extracting transformation information for the at least one bounding box image pair to obtain at least one surface representation that is encoded in an oriented bounding box and (iv) applying a bounding box transformation to the at least one tiled bounding box image pair to obtain oriented bounding box parameters includes the depth map and the texture in global coordinates in the global digital space.

The at least one bounding box image pair may include a grayscale image representing a depth map, and a color image representing texture. The at least one surface representation is parameterized in 2 dimensions as the depth map with color data. In some embodiments, the decompressed tiled bounding box image is in a lossy format. In some embodiments, the image decoder 110 splits the decompressed tiled bounding box image into metadata and an image in a lossy format. In some embodiments, the image decoder 110 and the GPU 112 are in same device. In some embodiments, the vertex shader 114 invalidates a pixel in one channel if a matching pixel in another channel is invalid. In some embodiments, the fragment shader 116 invalidates a fragment in one channel if a matching fragment in another channel is invalid. In some embodiments, each valid pixel in the depth is a vertex. In some embodiments, a valid pixel in the depth map defines a 3d point in the space of the oriented bounding box, which is then transformed into global digital space. In some embodiments, a pixel is defined as valid if it is valid in a depth map and in the corresponding pixel in the texture map. In some embodiments, if the depth map and the texture map are of different resolutions resampling occurs when checking to see if the pixel is valid.

The GPU 112 may include a vertex shader 114, a fragment shader 116 and a depth buffer 118. The GPU 112 obtains (i) the decompressed tiled bounding box image (i.e. in the lossy format) from the image decoder 110 and an oriented bounding box parameters from the network 106. In some embodiments, for each surface representation, the oriented bounding box parametrization is stored in the oriented bounding box description. In some embodiments, the decompressed tiled bounding box image includes a fixed number of matching texture and depth pairs. In some embodiments, the oriented bounding box parameters includes parameters defining position orientation, and size of the bounding box.

In some embodiments, the decompressed tiled bounding box image may include material information. In some embodiments, the material information is a 2d parameterization of material properties (e.g. anisotropic specularity). In some embodiments, the oriented bounding box parameters for each oriented bounding box is stored separately from the tiled bounding box image as the metadata or as an independent data stream. In yet another embodiment, the depth is encoded as a grayscale image in a luma channel and a material of the 3 dimensional object, or at least one unit-length surface normal of the at least one surface representation, is encoded in a U chroma channel and a V chroma channel.

In some embodiments, the decompressed tiled bounding box image (i.e. in the lossy format) from the image decoder 110 may include a texture image, a depth image and auxiliary render data. In some embodiments, each tiled image includes the color image, the depth image and the auxiliary render data. In some embodiments, the auxiliary render data includes surface normals and/or material information. The vertex shader 114 positions the surface representation in a 3 dimensional space based on the oriented bounding box parameters, and the user view input. In some embodiments, the surface representation is positioned in the 3 dimensional space by triangulating the depth map, or by converting each depth map into 3 dimensional points with normals and triangulating the 3 dimensional points in the global digital space.

In some embodiments, the vertex shader 114 obtains a range of values of the material information corresponding to an object type of a portion of the 3 dimensional object directly from the network 106, separate from the tiled bounding box image as metadata or as an independent data stream. In some embodiments, the object type may be a hair, hand, or any other parts of a human being or an animal. In some embodiments, the user view input is based on a position of a virtual camera. In some embodiments, the vertex shader 114 may obtain the user view input to enable the user to view the 3 dimensional an output image in one or more perspective views. The user may provide the input to the vertex shader 114 using a mouse, a keyboard or a touch screen.

In some embodiments, the GPU 112 uses its own environment (e.g. light sources and other scene elements not present in the 3D image) and determines view-dependent lighting based on surface normals calculated from the depth of the surface representations of the image and reflectivity information stored in the material channels. In some embodiments, the normal at a point in global digital space is calculated from neighboring points.

The fragment shader 116 applies the texture from the at least one bounding box image pair to the surface representation in the 3 dimensional space to obtain at least one textured surface representation. In some embodiments, traditional lighting effects based on the rendering scenario are applied to the geometry. In some embodiments, the traditional lighting effects may be standard rendering techniques such as diffuse shading and standard lights like point lights, spotlights, and directional lights. In some embodiments, material properties encoded in surface representation tile are used to add specular information to the final render. Following the fragment shader 116, the depth buffer 118 determines a visible surface for each display pixel based on the position of the virtual camera, which is obtained from the user view input.

Figure 2:
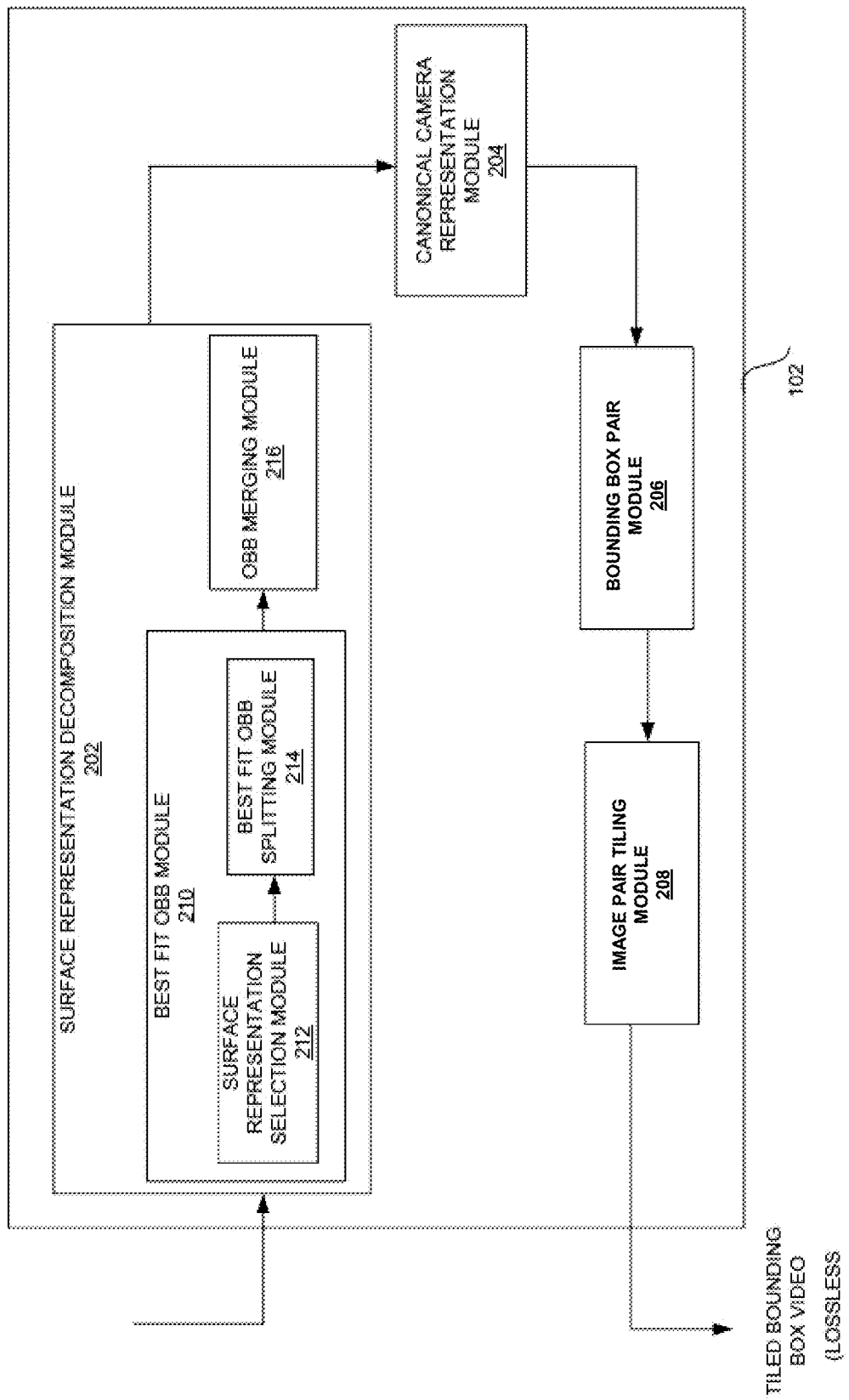
FIG. 2 is a block diagram of a surface representation encoder of FIG. 1 according to some embodiments herein.

FIG. 2 is a block diagram of the surface representation encoder 102 of FIG. 1 according to some embodiments herein. The surface representation encoder 102 includes a surface representation decomposition module 202, a canonical camera representation module 204, a bounding box image pair module 206 and an image pair tiling module 208. The surface representation decomposition module 202 includes a best fit oriented bounding box (OBB) module 210 and an oriented bounding box (OBB) merging module 216. The best fit OBB module 210 further includes a surface representation selection module 212 and a best fit oriented bounding box (OBB) splitting module 214. The surface representation decomposition module 202 obtains the surface data of the 3 dimensional object in the global digital space and decomposes the surface data into at least one surface representation that is encoded in an oriented bounding box.

The best fit OBB module 210 decomposes the surface data into at least one surface representation by dividing the surface data into at least one initial region, and constructing a best fit oriented bounding box. In some embodiments, the best fit oriented bounding box may be constructed such that each normal of each of the at least one surface representation within the best fit oriented bounding box is no more than 90 degrees apart from the bounding box axis most closely aligned with the median surface normal and there are no discontinuities in the depth map where one surface is not adjacently connected to another, for the at least one initial region. In some embodiments, the best fit oriented bounding box may be constructed such that each normal of each of the at least one surface representation within the best fit oriented bounding box is no more than 60 degrees apart from the bounding box axis most closely aligned with the median surface normal.

The best fit OBB splitting module 214 splits the best fit oriented bounding box into two or more oriented bounding boxes with normals that are not more than 90 degrees apart from the bounding box axis most closely aligned with the median surface normal. The surface representation selection module 212 selects a different type of surface representation based on a topology of the 3 dimensional object, if the best fit oriented bounding box includes normals that are more than 90 degrees apart from the bounding box axis most closely aligned with the median surface normal, or a hidden-surface discontinuity where one surface is not adjacently connected to another.

The OBB merging module 216 merges the oriented bounding boxes by selecting pairs of oriented bounding boxes that will produce the smallest volume increase over the sum of the volumes of the oriented bounding boxes before merging if a number of oriented bounding boxes exceeds a threshold. In some embodiments, the threshold is based on total number of color images/grayscale images that are stored in the output tiled image based on the selection of the user.

The canonical camera representation module 204 transforms the oriented bounding box into a canonical camera representation to obtain canonical coordinates for the at least one surface representation. In some embodiments, the canonical camera representation module 204 transforms the oriented bounding box into the canonical camera representation by scaling the oriented bounding box such that the depth map is represented at the bit depth that is supported by an image data compression algorithm of the image encoder 104. In some embodiments, the bit depth may be 8 bit, 10 bit or 12 bit.

The bounding box image pair module 206 converts each surface representation into at least one bounding box image pair that includes the grayscale image representing depth, and the color image. The depth map is encoded as the grayscale image representing depth, and the color image represents texture. In some embodiments, the grayscale image and the color image are encoded at different resolutions. The image pair tiling module 208 tiles the at least one bounding box image pair to produce the tiled bounding box image.

Figure 3:
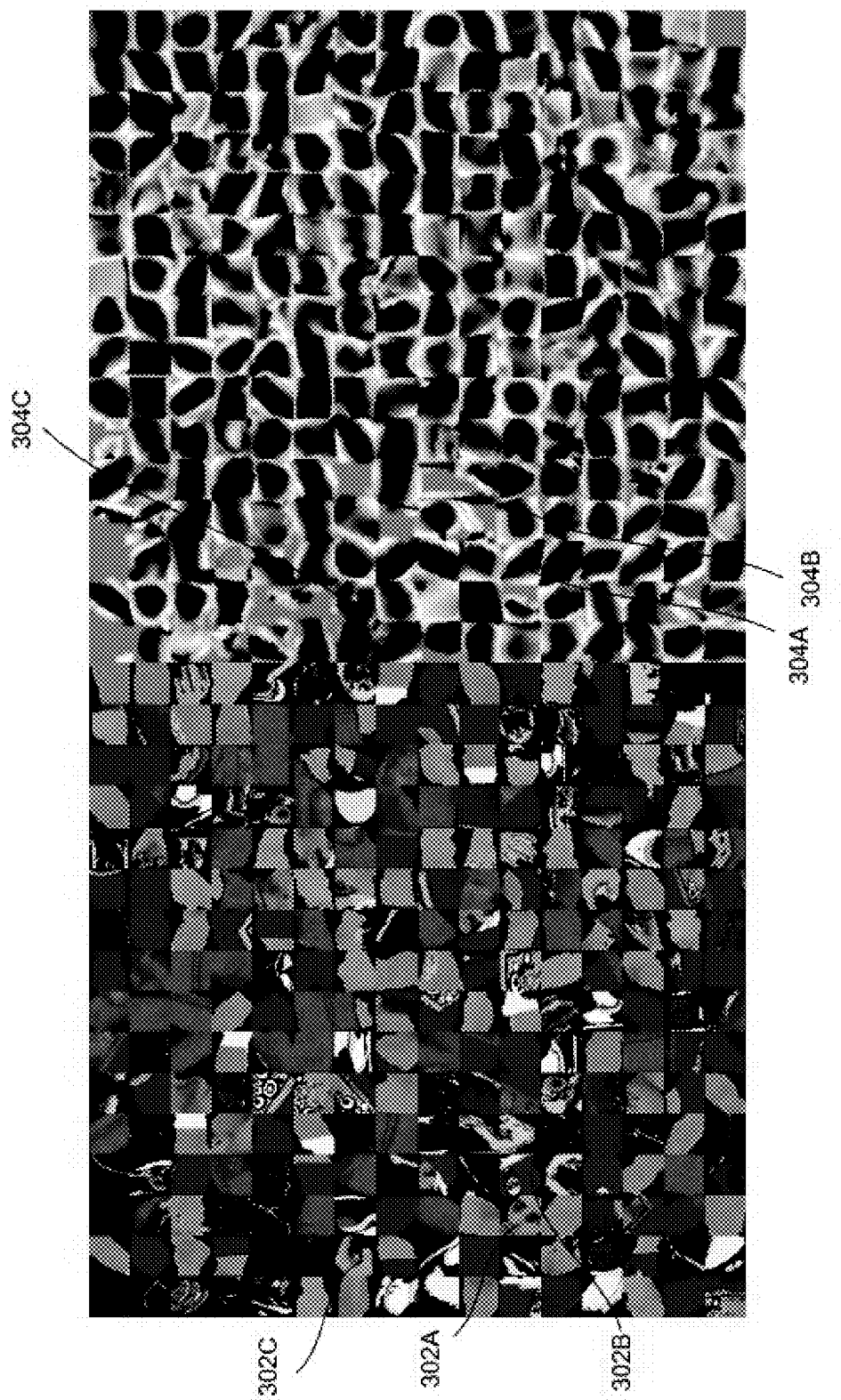
FIG. 3 is a screenshot of surface representations that are tiled in a color image and a grayscale image according to some embodiments herein.

FIG. 3 is a screenshot of surface representations that are tiled in a color image and a grayscale image according to some embodiments herein. The color image and the grayscale image are encoded at the same resolution in the screenshot. The screenshot depicts a humanoid image decomposed into one or more tiles. The screenshot includes colored images of a surface representation of a face 302A, a surface representation of a part of a cap 302B and a surface representation of a hand 302C of an object (e.g. a skater). and grayscale images of a surface representation of a face 304A, a surface representation of a part of a cap 304B and a surface representation a hand 304C of an object 304 of the one or more tiles of the tiled bounding box image. The colored images of the surface representation of the face 302A, the surface representation of the part of the cap 302B and the surface representation the hand 302C) match the grayscale images of the surface representation of the face 304A, the surface representation of the part of the cap 304B and the surface representation the hand 304C which represent the depth map. In some embodiments, a size of grids (e.g. 16×16 as shown in FIG. 3) is user defined that is based on the desired resolution of the output image. In some embodiments, a black square with white dots appears in a lower right corner of the texture data. In some embodiments, a data identifier is decoded when the image is decoded. In some embodiments, a data identification number for a surface representation is encoded using a Gray code. In some embodiments, the depth is in low resolution and the color is in high resolution to maintain the output image in high quality.

Figure 4:
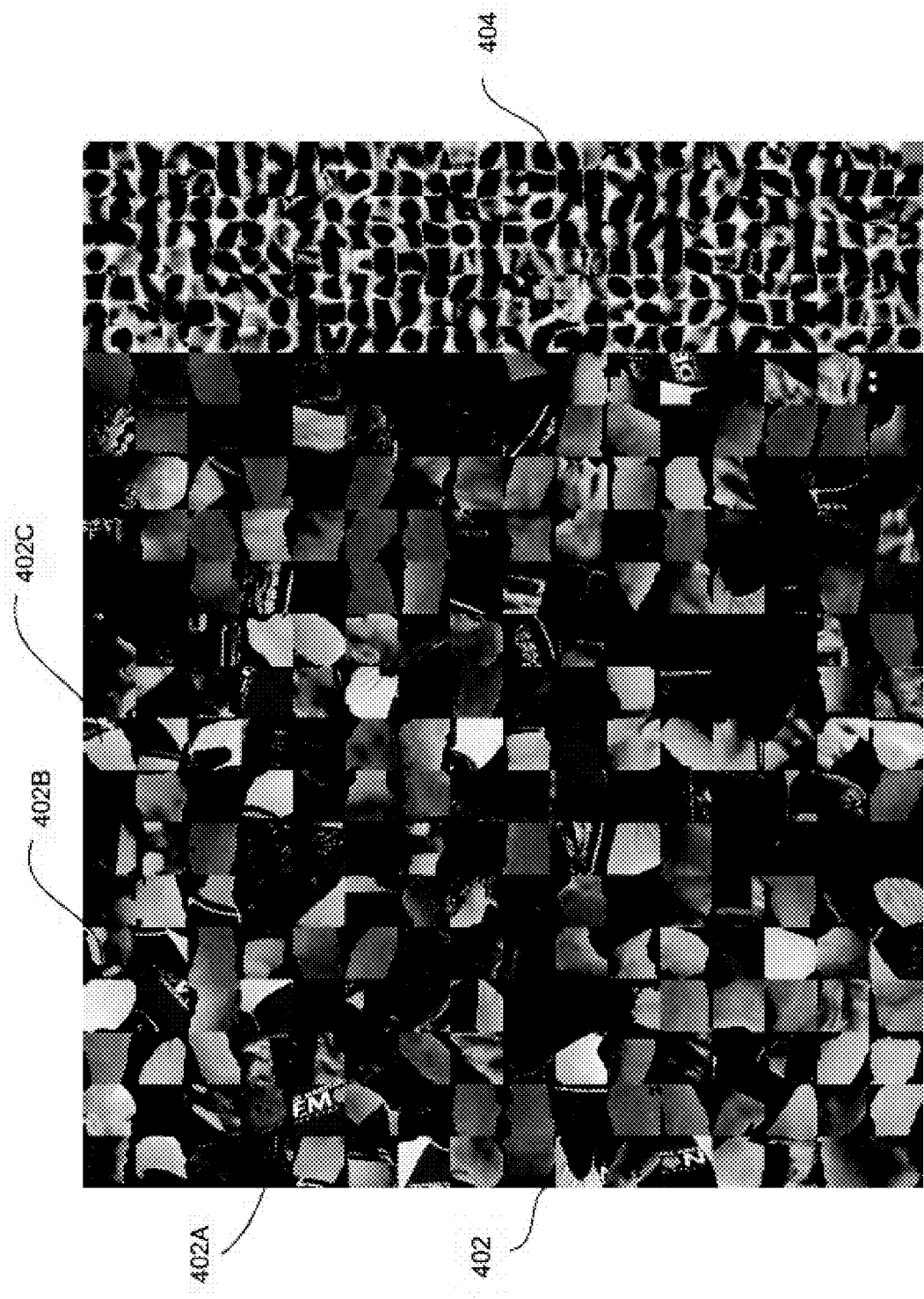
FIG. 4 is a screenshot of a color image and a grayscale image encoded in different resolutions, according to some embodiments herein.

FIG. 4 is a screenshot of a color image and a grayscale image are encoded in different resolutions, according to some embodiments herein. The screenshot depicts a frame in which the color image 402 and the grayscale image 404 of an object (e.g. a boxer) are encoded in different resolutions. The image includes one or more surface representations (e.g. a surface representation of a part of a T-shirt 402A, a surface representation of a part of a hand 402B, a surface representation of a part of a glove 402C, a surface representation of a face, a surface representation of hands, a surface representation of legs, a surface representation of head, a surface representation of shoes or surface representations of any other parts of the boxer) of the object. In some embodiments, a black square with white dots appears in a lower right corner of the texture data. In some embodiments, a data identification number for a surface representation is encoded using a Gray code. In some embodiments, the depth is in low resolution and the color is in high resolution to maintain the output image in high quality.

Figure 5A:
FIG. 5A is a screenshot illustrating boundaries of surface representations in a region that is preselected, or recognized to be important according to some embodiments herein.

FIG. 5A is a screenshot illustrating boundaries of surface representations in a region that is preselected, or recognized to be important according to some embodiments herein. In some embodiments, a resolution may be changed for a point of interest, such as, face, hands, or a predetermined location based at least in part on the application, user choices, or other criteria. In another embodiment, selection of desired areas with higher resolution could be made by a director based on product placement, changes based on user's selection, etc.

The screenshot depicts surface representations for an important region. Surface representations 502A and 502 B cover a nose region and surface representations 502C and 502D cover a cheek region) in a closeup headshot. In some embodiments, the important tile boundaries are tagged in a face as "important", and the surface representations are smaller leading to a higher resolution on the face. In some embodiments, at least one initial region that includes the at least one surface representation is preselected, or recognized based on automatic object recognition, and a resolution for the at least one surface representation in the at least one initial region is modified accordingly.

Figure 5B:
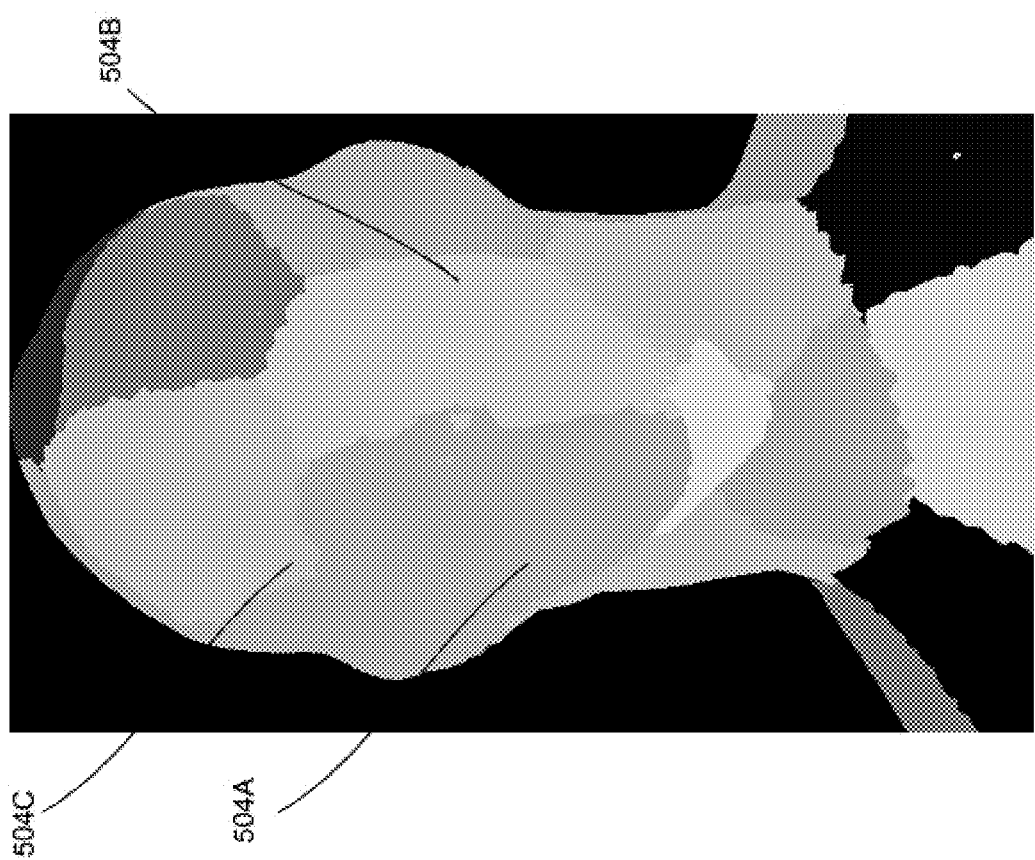
FIG. 5B is a screenshot illustrating boundaries of surface representations in a standard region according to some embodiments herein.

FIG. 5B is a screenshot illustrating boundaries of surface representations in a standard region according to some embodiments herein. The screenshot depicts surface representations 504A, 504B, and 504C, for a standard region in the closeup headshot. In some embodiments, a number of surface representations for the important region is more as compared to a number of surface representations for the standard region. In some embodiments, for the same region (as shown in FIGS. 5A and 5B) if it is treated as a standard region, the number of surface representations are less (e.g. a number of surface representations for a face of an object in standard region is 8 and the number of surface representations for the face of the object is 20 as shown in FIG. 5A and FIG. 5B). In some embodiments, in the same region (as shown in FIGS. 5A and 5B) if it is preselected, or recognized as the important region, the number of surface representations is higher. In other embodiments, the number of surface representations 502 for the important region and the number of surface representations for the standard region is same, but a number of pixels per surface representation in the tiled boundary box image is more for the region which is preselected as important, so that a number of pixels per millimeter is more in the region which is preselected as important.

Figure 6A:
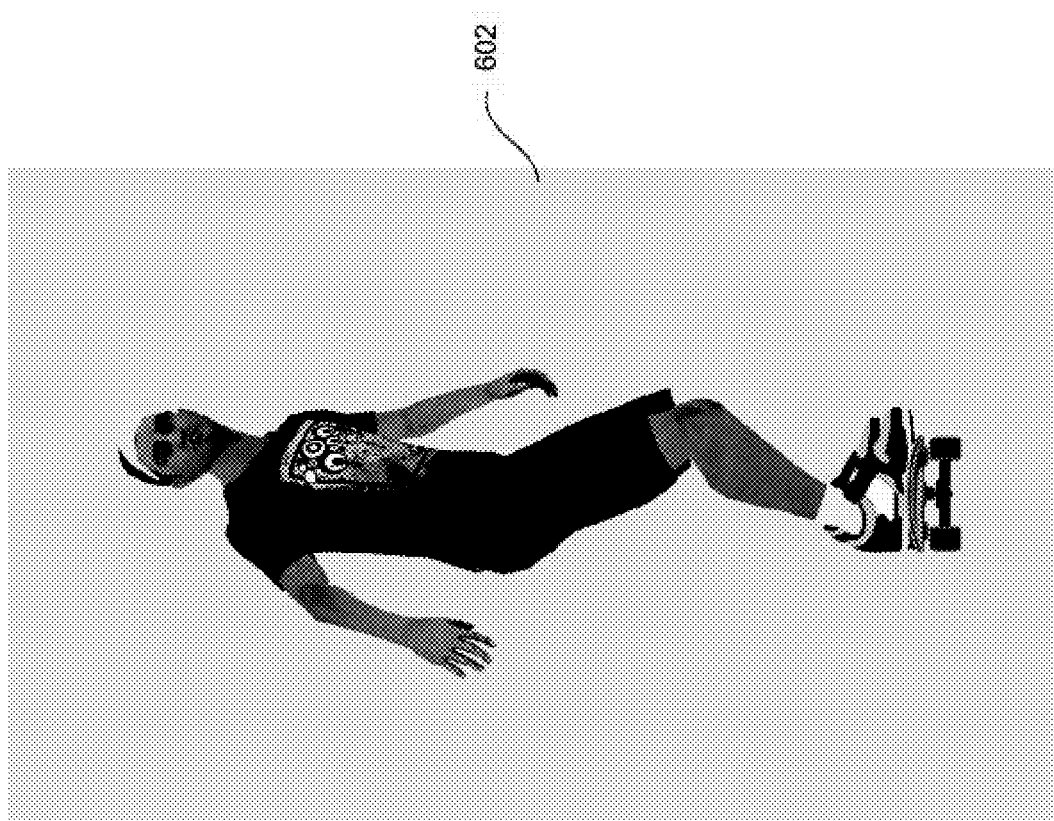
FIGS. 6A and 6B are screenshots illustrating different exemplary views of 2 dimensional images reconstructed from the frame of FIG. 3 according to some embodiments herein.
Figure 6B:
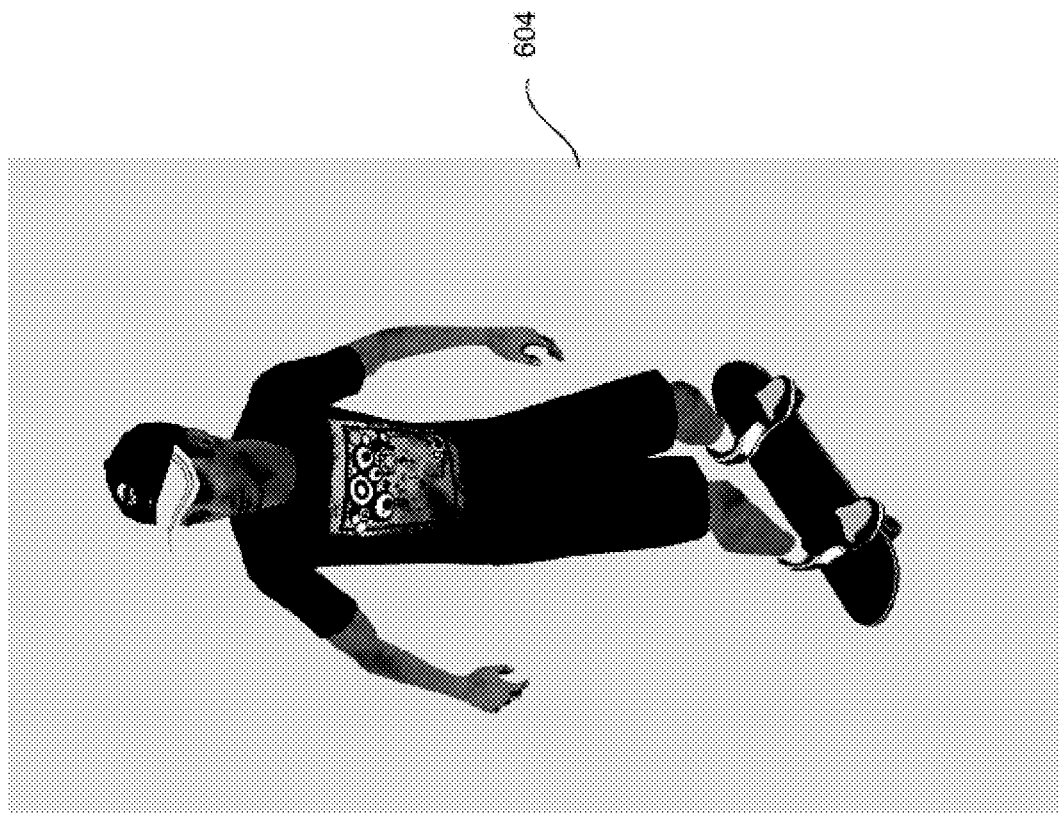

FIGS. 6A and 6B are screenshots illustrating different exemplary views of 2 dimensional images reconstructed from the frame of FIG. 3 according to some embodiments herein. The screenshots depict a synthetic data input (e.g. of the skater) that is visualized in tiled image form in one or more views (602 and 604). In some embodiments, a cap of the skater may correspond to the surface representation 302B of a part of a cap of the skater. In some embodiments, the 2 dimensional images are visualized in one or more views based on the user view input. In some embodiments, the GPU 112 allows the user to render the scene from multiple viewpoints selected by the user. The user may provide the input using the mouse, the key board or the touch screen. In some embodiments, the one or more views are based on the position of the virtual camera.

Figure 7A:
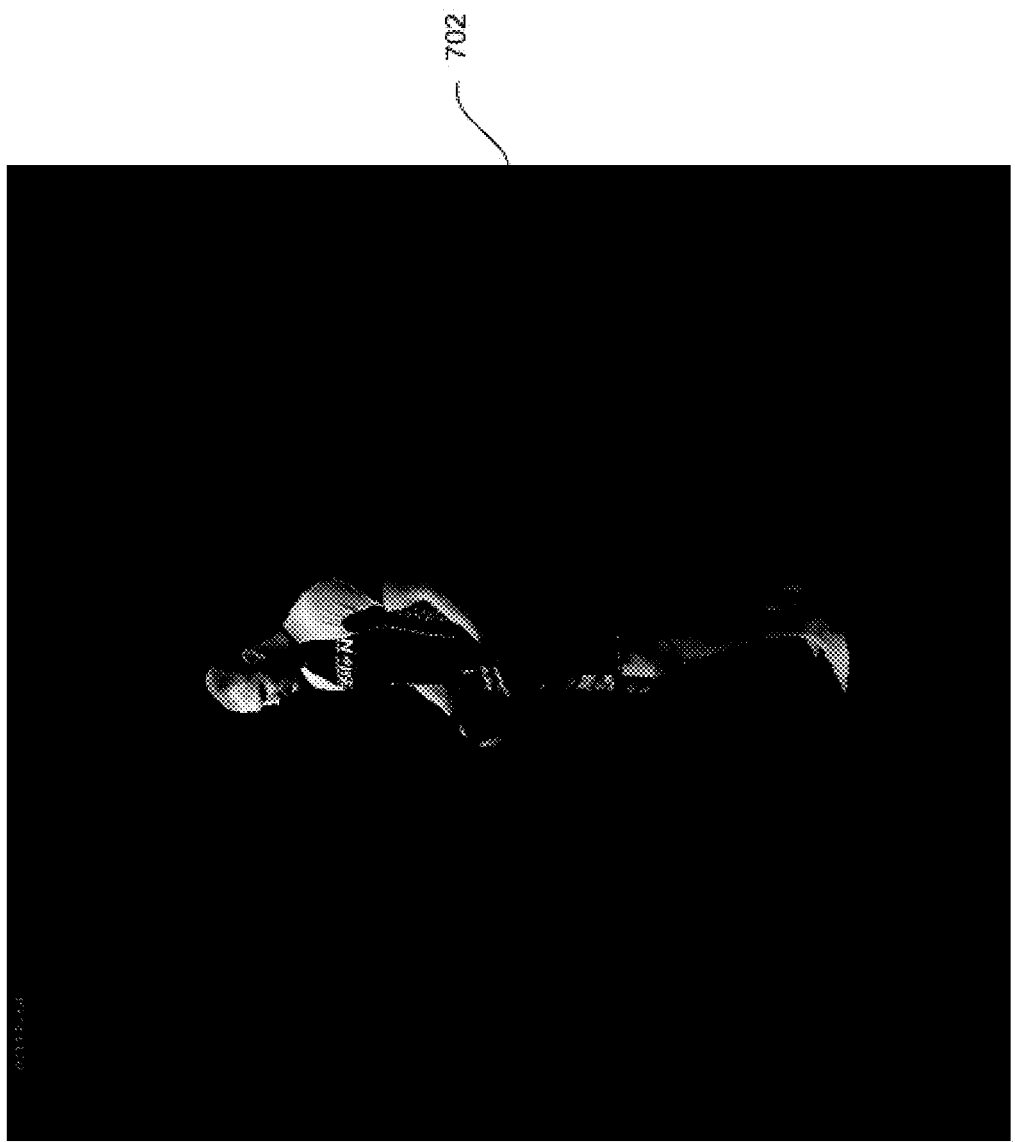
FIGS. 7A and 7B are screenshots illustrating different exemplary views of 2 dimensional images reconstructed from the frame of FIG. 4 according to some embodiments herein.
Figure 7B:
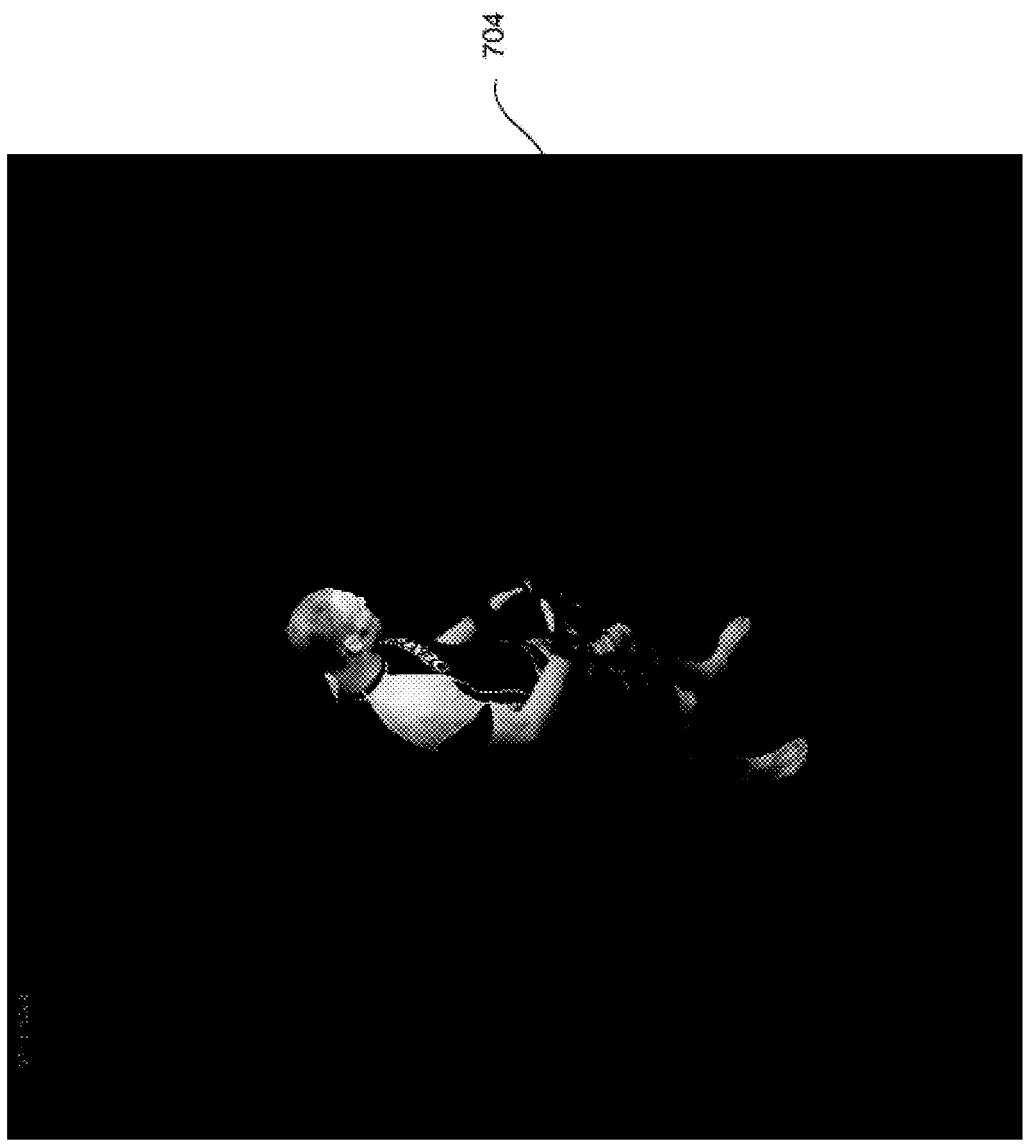

FIGS. 7A and 7B are screenshots illustrating different exemplary views of 2 dimensional images reconstructed from the frame of FIG. 4 according to some embodiments herein. In some embodiments, an object (e.g. a boxer) may be reconstructed from a real image. In some embodiments, an input (e.g. surface) is obtained by filming a real human being (e.g. the boxer) and that image is compressed using the surface representation encoder 102 and the image encoder 104, transmitted through the network 108, decompressed using the image decoder 110 and converted into a 2 dimensional image and rendered based on the user input using the GPU 112. In some embodiments, the object (e.g. the boxer) is displayed in different perspectives based on a position of a virtual camera, which is controlled/selected, by the user. The screenshot depicts a right-side perspective view 702 and a left side perspective 704 of the object based on the user view input. In some embodiments, the surface representations of a T-shirt of the object (e.g. the boxer) may correspond to a surface representation of part of a T-shirt 402A, a surface representation of a part of hand 402B and a surface representation of a part of glove 402C.

Figure 8:
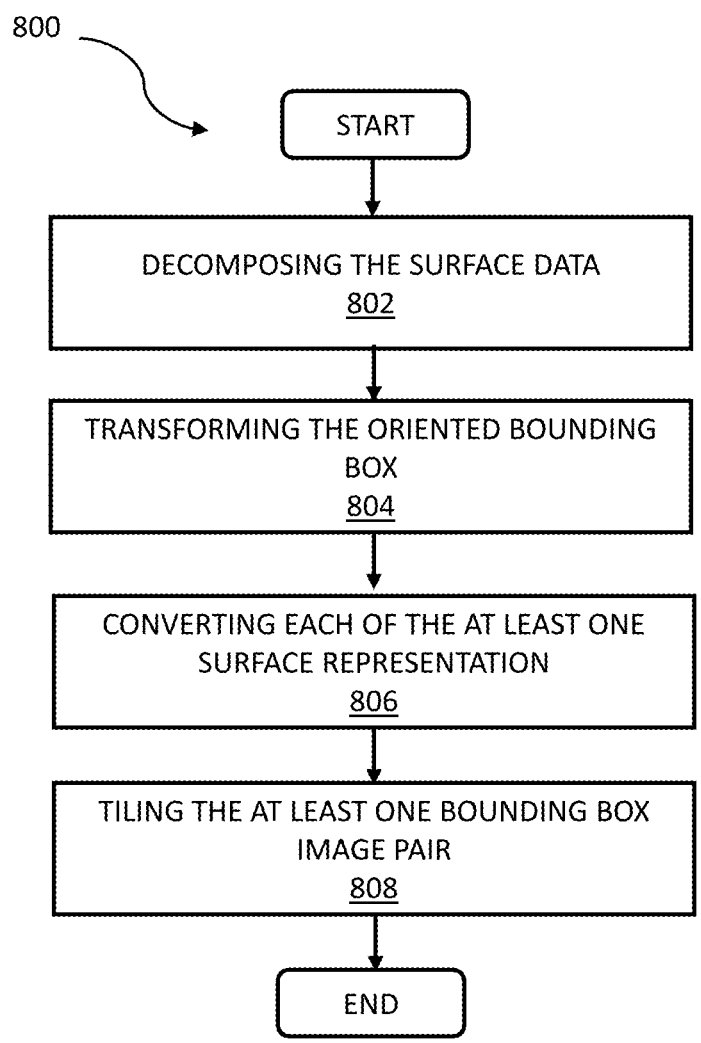
FIG. 8 is a flow chart of a method of compressing surface data of a 3 dimensional object in a global digital space according to some embodiments herein.

FIG. 8 is a flow chart of a method of compressing surface data of a 3 dimensional object in a global digital space according to some embodiments herein. At step 802, the surface data is decomposed into at least one surface representation that is encoded in an oriented bounding box. At step 804, the oriented bounding box is transformed into a canonical camera representation to obtain canonical coordinates for the at least one surface representation. At step 806, each of the at least one surface representation is converted into at least one bounding box image pair that includes a grayscale image representing depth, and a color image. At step 808, the at least one bounding box image pair is tiled to produce a tiled bounding box image. In some embodiments, the at least one surface representation is parameterized in 2 dimensions as a depth map with color data, and the oriented bounding box is parameterized to define a location and an orientation in the global digital space. In some embodiments, the depth map is encoded by the image encoder 104 as the grayscale image, and the color image represents texture. In some embodiments, the image encoder 104 compresses the tiled bounding box image to obtain a compressed tiled bounding box image.

In some embodiments, the at least one surface representation is in the shape of at least one of a rectangular grid, a pipe, a cylinder, and a truncated pyramid, at least one parameter that characterizes the at least one surface representation is, stored separately from the tiled bounding box image as metadata or as an independent data stream, and the at least one parameter is used to transform the surface representation from the canonical coordinates back to the global digital space.

In some embodiments, the at least one surface representation may be in the shape of the cylinder, and a minimum radius, a maximum radius, and an axis length of the cylinder are stored separately from the tiled bounding box image as metadata or as an independent data stream, the oriented bounding box is defined by a position, an orientation, the axis length and a radius of the cylinder, and depth pixels are represented by values of the radius along axial and azimuthal directions.

In some embodiments, the surface representation may be the truncated pyramid in which a height, base width, base length, and slope of the pyramid are stored separately from the tiled bounding box image as the metadata or as the independent data stream. In some embodiments, the oriented bounding box is defined by a position, an orientation, the height, base length, base width, and slope of the pyramid, and depth pixels are represented by values of the height between the base and tip of the pyramid.

In some embodiments, the oriented bounding box is transformed into the canonical camera representation by inverting position, rotation and warping transformations. In some embodiments, the canonical camera representation of the oriented bounding box in the canonical coordinates for the oriented bounding box is stored separately from the tiled bounding box image as metadata or as an independent data stream.

In some embodiments, the depth is encoded as a grayscale image in a luma channel. In some embodiments, material information of a material of the 3 dimensional object, or at least one unit-length surface normal of the at least one surface representation may be encoded in an unused U chroma channel and an unused V chroma channel. In some embodiments, the rendering may use luma screening where the reserved values indicating background pixels are a subset of the luma channel of the color texture. In some embodiments, the rendering may use depth screening where the reserved values indicating background pixels are a subset of the depth channel of the luma channel.

In some embodiments, a 2D vector that represents a principal axis of anisotropy in the material of the 3 dimensional object is defined using the U chroma channel and the V chroma channel. In some embodiments, when a magnitude of the 2D vector is above a threshold, the material is determined to be anisotropic, and when the magnitude of the 2D vector is below the threshold, the material is determined to be isotropic. In some embodiments, from the magnitude of zero to a threshold, the material is interpreted as going from shiny to matte, and then from the threshold to the maximum, the material is interpreted as going from matte to shiny in the direction of the vector, while maintaining a constant matte reflectivity in a direction perpendicular to the vector.

In some embodiments, when a representation of the depth map requires more bits than a bit depth that is supported by the image coding standard of the image encoder 104, the representation of the depth map is encoded in a first depth tile and residual information is encoded in a second depth tile. In some embodiments, in compression invalid pixels are represented in only one channel selected from a depth channel and a color channel, and valid pixels are extrapolated from the channel in which invalid pixels are not represented. In some embodiments, a surface representation having a lower resolution, as measured by pixels per unit surface area in the global digital space, is detected, and a pre-defined value is subtracted from the depth map project the surface representation having a lower resolution behind a surface representation having a higher resolution, when any two of the at least one surface representation overlap.

In some embodiments, the compression is improved by trading off geometric detail (e.g. the resolution of the depth map) with texture detail (e.g. resolution of the color image). In some embodiments, the compression is improved by encoding the screened edges of the surface representation only once by filling in background pixels from the non-screen channels (e.g. the chroma, the depth map and material channels) with values that are consistent with non-background pixels. In some embodiments, where there are a small number of frames, e.g., 1-5 frames, it is more efficient to use an image codec than a video codec to compress each frame independently. In some embodiments, any suitable image codec may be used such as a PNG image codec or an JPEG image codec to compress each frame individually.

In some embodiments, the compression is further improved by identifying entire 8×8 DCT blocks that are unnecessary and zeroing them out. In some embodiments, the entire 8×8 DCT blocks are identified as unnecessary, due to entire 8×8 DCT blocks entirely representing background, or an overlapping surface representation has a better parameterization of that same portion of the surface.

Figure 9:
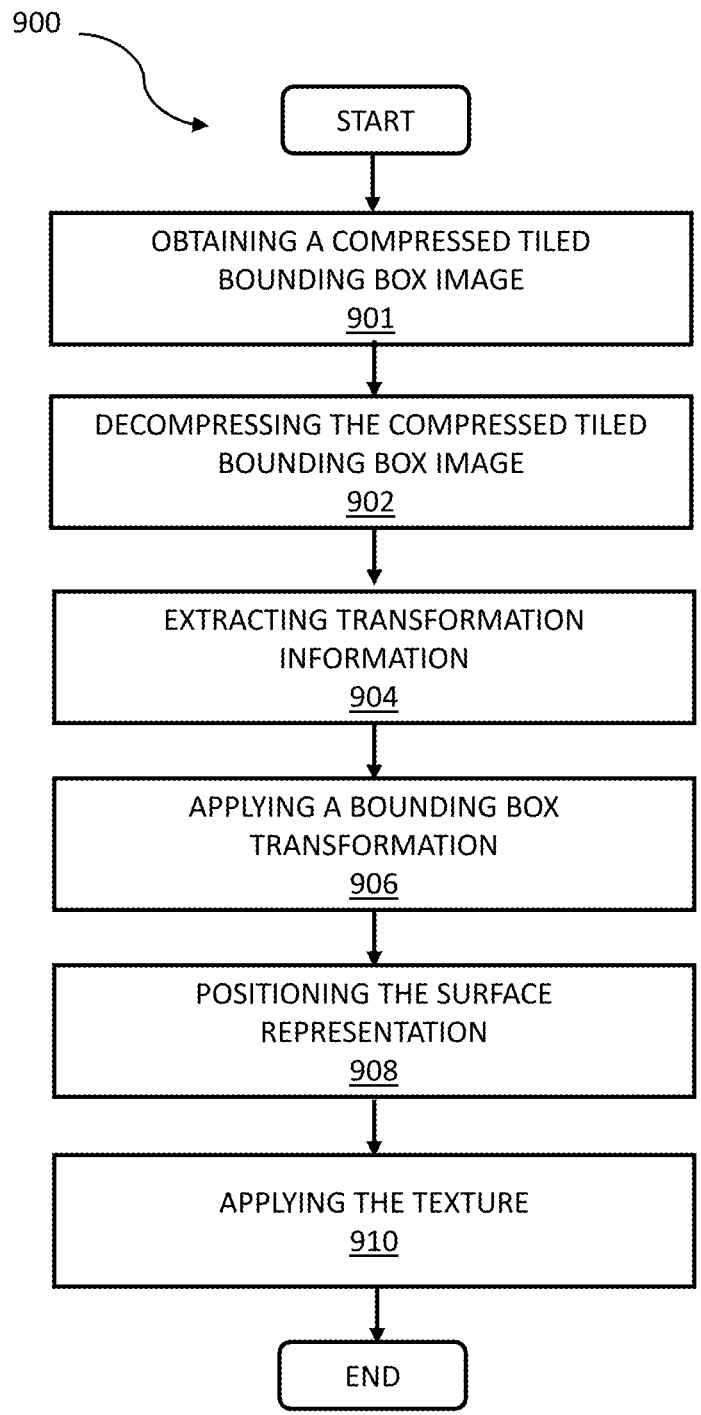
FIG. 9 is a flow chart of a method of decompressing compressed surface data of a 3 dimensional object in a global digital space using an image decoder that supports an image data decompression algorithm according to some embodiments herein.

FIG. 9 is a flow chart of a method of decompressing compressed surface data of a 3 dimensional object in a global digital space using the image decoder 110 that supports an image data decompression algorithm according to some embodiments herein. At step 901 a compressed tiled bounding box image is obtained. At step 902, the compressed tiled bounding box image is decompressed to obtain a tiled bounding box image that includes at least one bounding box image pair. At step 904, transformation information for the at least one bounding box image pair is extracted to obtain at least one surface representation that is encoded in an oriented bounding box. At step 906, a bounding box transformation is applied to the at least one tiled bounding box image pair to obtain oriented bounding box parameters including the depth map and the texture in global coordinates in the global digital space.

At step 908, the surface representation is positioned in a 3 dimensional space based on the oriented bounding box parameters, and the user view input. At step 910, the texture from the at least one bounding box image pair is applied to the surface representation in the 3 dimensional space to obtain at least one textured surface representation. In some embodiments, the at least one bounding box image pair includes a grayscale image representing a depth map, and a color image representing texture. In some embodiments, the at least one surface representation is parameterized in 2 dimensions as the depth map with color data.

In some embodiments, the surface representation is positioned in the 3 dimensional space by triangulating the depth map, or by converting each depth map into 3 dimensional points with normals and triangulating the 3 dimensional points in the global digital space. In some embodiments, the triangulation may be naive triangulations of the individual surface representation depth maps. In some embodiments, an alternative meshing technique is used if this data format is used as input to another method (for example, finite element simulation). In some embodiments, points and normals in the global digital space are reconstructed, then input to a global optimization to reconstruct a surface. In some embodiments, Poisson surface reconstruction may be used for the reconstruction of a surface. In some embodiments, an isosurface is created from the points and normals and marching cubes is applied for the reconstruction of a surface.

In some embodiments, a visible surface for each display pixel is determined, to render the 2 dimensional image from a perspective that is determined by a position of a virtual camera, which is obtained from the user view input. In some embodiments, view dependent lighting is rendered on the textured surface representation based on a material information and the surface normal, where normals come from either the depth chroma channel or are computed from the surface geometry.

In some embodiments, an original surface is reconstructed using a naïve meshing of the depth map (e.g. by connecting neighboring pixels together to build triangles), or any of a variety of other image-based rendering techniques from the literature by positioning each depth map according to the bounding box parameterization. In some embodiments, the color of each surface representation is applied to the reconstructed surface directly since the color image is parameterized identically.

In some embodiments, a surface representation may be identified as hair (e.g. through an extra flag). In another embodiment, the data format is combined with other digital assets and/or inserted into an augmented reality experience. In some embodiments, this 3 dimensional image may easily composited with other 3 dimensional images, artist-created animations and scenes, and other CG renderings, whilst maintaining realism by having consistent view-dependent lighting among all elements if an approximation to global illumination field is specified.

In some embodiments, the tiled bounding box image further includes the material information. In some embodiments, a range of values of the material information corresponding to an object type of a portion of the 3 dimensional object is obtained directly from the network 106, separate from the tiled bounding box image as metadata or as an independent data stream. In another embodiment, the object type is detected based on the range of values of the material information corresponding to the portion of the 3 dimensional object. In some embodiments, specular reflections are computed based on a principal axis vector of the portion of the 3 dimensional object.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
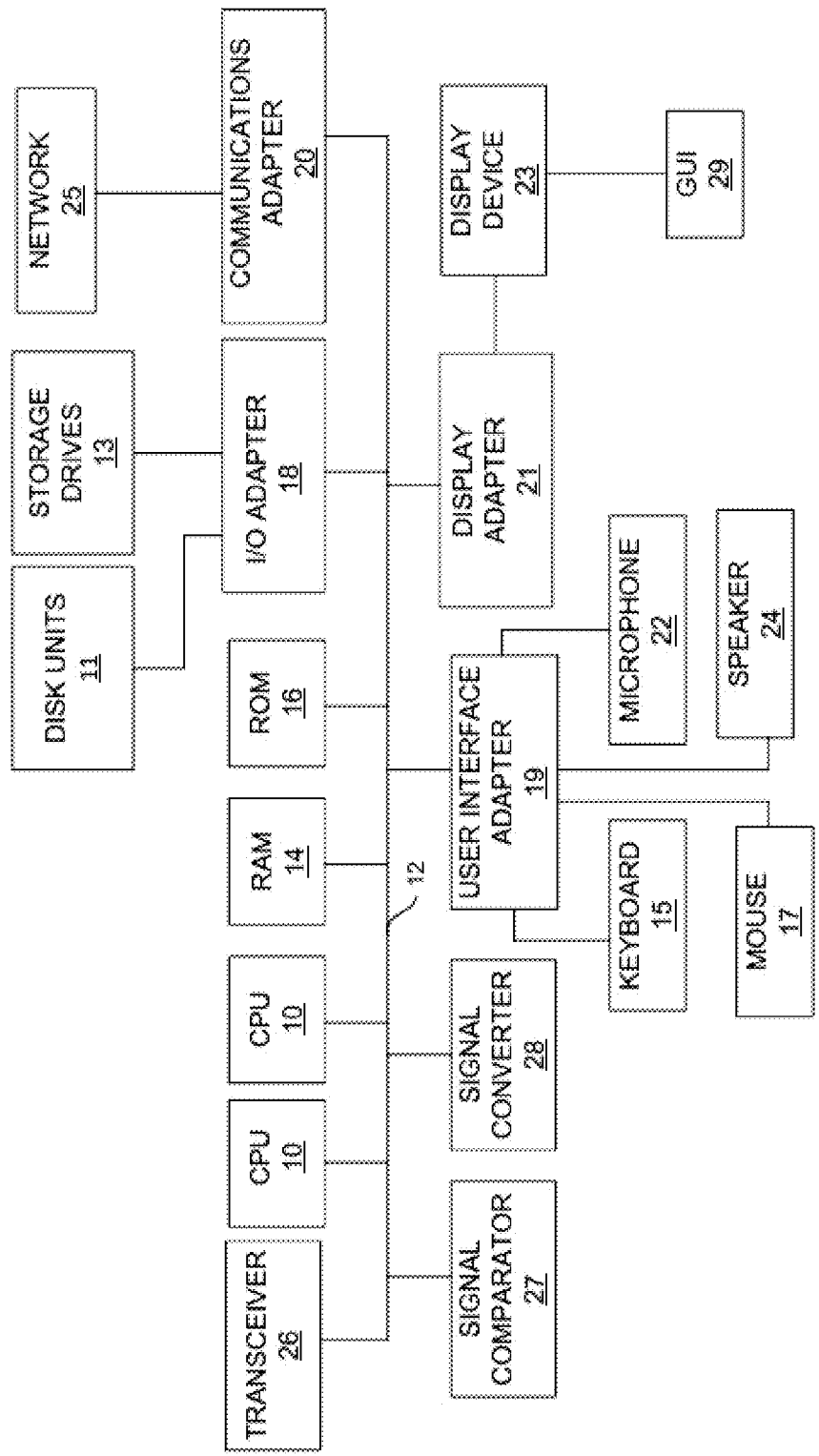
FIG. 10 is a block diagram of a schematic diagram of a device used in accordance with embodiments herein.

A representative hardware environment for practicing the embodiments herein is depicted in FIG. 10, with reference to FIGS. 1 through 9. This schematic drawing illustrates a hardware configuration of a server/computer system/user device in accordance with the embodiments herein. The user device includes at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The user device can read the inventive instructions on the program storage devices and follow these instructions to execute the methodology of the embodiments herein. The user device further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor implemented method for compressing surface data of a 3 dimensional object in a global digital space, using an image encoder that supports an image data compression algorithm, the image encoder being coupled to a transmitter, the method comprising:

decomposing the surface data into at least one surface representation that is encoded in an oriented bounding box, wherein the at least one surface representation is parameterized in 2 dimensions as a depth map with color data, and the oriented bounding box is parameterized to define a location and an orientation in the global digital space;

transforming the oriented bounding box into a canonical camera to obtain canonical coordinates for the at least one surface representation;

converting each of the at least one surface representation into at least one bounding box image pair that comprises a grayscale image representing depth, and a color image, wherein the depth map is encoded by the image encoder as the grayscale image, and wherein the color image represents texture; and tiling the at least one bounding box image pair to produce a tiled bounding box image, wherein the image encoder compresses the tiled bounding box image to obtain a compressed tiled bounding box image.

2. The processor implemented method of claim 1, wherein the transforming the oriented bounding box into the canonical camera representation comprises scaling the oriented bounding box such that the depth map is represented at a bit depth that is supported by the image data compression algorithm, of the image encoder.

3. The processor implemented method of claim 1, wherein the at least one surface representation is in the shape of at least one of a rectangular grid, a pipe, a cylinder, and a truncated pyramid, at least one parameter that characterizes the at least one surface representation is, stored separately from the tiled bounding box image as metadata or as an independent data stream, wherein the at least one parameter is used to transform the surface representation from the canonical coordinates back to the global digital space.

4. The processor implemented method of claim 1, wherein the decomposing the surface data into the at least one surface representation comprises dividing the surface data into at least one initial region, and constructing a best fit oriented bounding box.

5. The processor implemented method of claim 4, wherein the best fit oriented bounding box is constructed such that each normal of each of the at least one surface representation within the best fit oriented bounding box is no more than 90 degrees apart from the bounding box axis most closely aligned with the median surface normal and there are no discontinuities in the depth map where one surface is not adjacently connected to another, for the at least one region.

6. The processor implemented method of claim 4, wherein if the best fit oriented bounding box includes normals that are more than 90 degrees apart from the bounding box axis most closely aligned with the median surface normal, or a hidden-surface discontinuity where one surface is not adjacently connected to another, then the best fit oriented bounding box is split into two or more oriented bounding boxes with normals that are not more than 90 degrees apart from the bounding box axis most closely aligned with the median surface normal, or a different type of surface representation is selected based on a topology of the 3 dimensional object.

7. The processor implemented method of claim 4, wherein the best fit oriented bounding box is constructed such that each normal of each of the at least one surface representation within the best fit oriented bounding box is no more than 60 degrees apart from the bounding box axis most closely aligned with the median surface normal.

8. The processor implemented method of claim 1, wherein if a number of oriented bounding boxes exceeds a threshold, then the oriented bounding boxes are merged by selecting pairs of oriented bounding boxes that will produce the smallest volume increase over the sum of the volumes of the oriented bounding boxes before merging.

9. The processor implemented method of claim 1, wherein the image data compression algorithm is based on an image coding standard selected from PNG, JPEG, TIFF, and BMP.

10. The processor implemented method of claim 1, wherein the grayscale image and the color image are encoded at different resolutions.

11. The processor implemented method of claim 1, wherein the oriented bounding box is transformed into the canonical camera representation by inverting position, rotation and warping transformations.

12. The processor implemented method of claim 1, wherein the canonical camera representation of the oriented bounding box in the canonical coordinates for the oriented bounding box is stored separately from the tiled bounding box image as metadata or as an independent data stream.

13. The processor implemented method of claim 1, further comprising encoding the depth as a grayscale image in a luma channel and encoding material information of a material of the 3 dimensional object, or at least one surface normal of the at least one surface representation in a U chroma channel and a V chroma channel.

14. The processor implemented method of claim 13, further comprising defining a 2D vector that represents a principal axis of anisotropy in the material of the 3 dimensional object using the U chroma channel and the V chroma channel, wherein when a magnitude of the 2D vector is above a threshold, the material is determined to be anisotropic, and when the magnitude of the 2D vector is below the threshold, the material is determined to be isotropic.

15. The processor implemented method of claim 4, wherein the at least one initial region that comprises the at least one surface representation is preselected, or recognized based on automatic object recognition, and a resolution for the at least one surface representation in the at least one initial region is modified.

16. The processor implemented method of claim 9, wherein when a representation of the depth map requires more bits than a bit depth that is supported by the image coding standard of the image encoder, the representation of the depth map is encoded in a first depth tile and residual information is encoded in a second depth tile.

17. The processor implemented method of claim 1, wherein invalid pixels are represented in only one image selected from the grayscale image and the color image, and valid pixels are extrapolated to overwrite the invalid pixels in the image in which invalid pixels are not represented.

18. The processor implemented method of claim 1, further comprising detecting a surface representation having a lower resolution, and subtracting a pre-defined value from the depth map to project the surface representation having a lower resolution behind a surface representation having a higher resolution, when any two of the at least one surface representation overlap.

19. A method for decompressing compressed surface data of a 3 dimensional object in a global digital space using an image decoder that supports an image data decompression algorithm, the method comprising:

obtaining a compressed tiled bounding box image;

decompressing the compressed tiled bounding box image to obtain a tiled bounding box image that comprises at least one bounding box image pair, wherein the at least one bounding box image pair comprises a grayscale image representing a depth map, and a color image representing texture;

extracting transformation information for the at least one bounding box image pair to obtain at least one surface representation that is encoded in an oriented bounding box, wherein the at least one surface representation is parameterized in 2 dimensions as the depth map with color data;

applying a bounding box transformation to the at least one tiled bounding box image pair to obtain oriented bounding box parameters comprising the depth map and the texture in global coordinates in the global digital space;

positioning the surface representation in a 3 dimensional space based on the oriented bounding box parameters, and the user view input; and applying the texture from the at least one bounding box image pair to the surface representation in the 3 dimensional space to obtain at least one textured surface representation.

20. The method of claim 19, wherein the surface representation is positioned in the 3 dimensional space by triangulating the depth map, or by converting each depth map into 3 dimensional points and triangulating the 3 dimensional points in the global digital space.

21. The method of claim 19, further comprising determining a visible surface for each display pixel to render the 2 dimensional image from a perspective that is determined by a position of a virtual camera, which is obtained from the user view input.

22. The method of claim 19, further comprising extracting normals from chroma channels or computing surface normals from the depth map and rendering view dependent lighting on the textured surface representation based on a material information and the surface normals, wherein the tiled bounding box image further comprises the material information.

23. The method of claim 22, further comprising:
obtaining a range of values of the material information corresponding to an object type of a portion of the 3 dimensional object directly from a network, separate from the tiled bounding box image as metadata or as an independent data stream;
detecting the object type based on the range of values of the material information corresponding to the portion of the 3 dimensional object; and
computing specular reflections based on a principal axis vector of the portion of the 3 dimensional object.

24. One or more non-transitory computer readable storage mediums storing one or more sequences of instructions, which when executed by one or more processors, causes a processor implemented method for compressing surface data of a 3 dimensional object in a global digital space, using an image encoder that supports an image data compression algorithm, the method comprising:
decomposing the surface data into at least one surface representation that is encoded in an oriented bounding box, wherein the at least one surface representation is parameterized in 2 dimensions as a depth map with color data, and the oriented bounding box is parameterized to define a location and an orientation in the global digital space;
transforming the oriented bounding box into a canonical camera representation to obtain canonical coordinates for the at least one surface representation;
converting each of the at least one surface representation into at least one bounding box image pair that comprises a grayscale image representing depth, and a color image, wherein the depth map is encoded by the image encoder as the grayscale image, and wherein the color image represents texture; and
tiling the at least one bounding box image pair to produce a tiled bounding box image, wherein the image encoder compresses the tiled bounding box image to obtain a compressed tiled bounding box image.

25. The one or more non-transitory computer readable storage mediums storing the one or more sequences of instructions of claim 24, wherein the transforming the oriented bounding box into the canonical camera representation comprises scaling the oriented bounding box such that the depth map is represented at a bit depth that is supported by the image data compression algorithm of the image encoder.

26. The one or more non-transitory computer readable storage mediums storing the one or more sequences of instructions of claim 24, wherein the decomposing the surface data into the at least one surface representation comprises dividing the surface data into at least one initial region, and constructing a best fit oriented bounding box.

27. The one or more non-transitory computer readable storage mediums storing the one or more sequences of instructions of claim 26, wherein if the best fit oriented bounding box includes normals that are more than 90 degrees apart from the bounding box axis most closely aligned with the median surface norm, or a hidden-surface discontinuity where one surface is not adjacently connected to another, then the best fit oriented bounding box is split into two or more oriented bounding boxes with normals that are not more than 90 degrees apart from the bounding box axis most closely aligned with the median surface normal, or a different type of surface representation is selected based on a topology of the 3 dimensional object.

28. The one or more non-transitory computer readable storage mediums storing the one or more sequences of instructions of claim 27, wherein the different type of surface representation that is selected based on the topology of the 3 dimensional object is in the shape of a cylinder, wherein a minimum radius, a maximum radius, and an axis length of the cylinder are stored separately from the tiled bounding box image as metadata or as an independent data stream, the oriented bounding box is defined by a position, an orientation, the axis length and a radius of the cylinder, and depth pixels are represented by values of the radius along axial and azimuthal directions.

29. A system for compressing surface data of a 3 dimensional object in a global digital space, using an image encoder that supports an image data compression algorithm comprising:
a processor; and
a non-transitory computer readable storage medium storing one or more sequences of instructions, which when executed by the processor, performs a method comprising:
decomposing the surface data into at least one surface representation that is encoded in an oriented bounding box, wherein the at least one surface representation is parameterized in 2 dimensions as a depth map with color data, and the oriented bounding box is parameterized to define a location and an orientation in the global digital space;
transforming the oriented bounding box into a canonical camera representation to obtain canonical coordinates for the at least one surface representation;

converting each of the at least one surface representation into at least one bounding box image pair that comprises a grayscale image representing depth, and a color image, wherein the depth map is encoded by the image encoder as the grayscale image, and wherein the color image represents texture; and tiling the at least one bounding box image pair to produce a tiled bounding box image, wherein the image encoder compresses the tiled bounding box image to obtain a compressed tiled bounding box image.

\* \* \* \* \*